United States Patent
Pettit

(10) Patent No.: US 7,081,312 B1
(45) Date of Patent: Jul. 25, 2006

(54) MULTIPLE STAGE COMBUSTION PROCESS TO MAINTAIN A CONTROLLABLE REFORMATION TEMPERATURE PROFILE

(75) Inventor: William Henry Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 980 days.

(21) Appl. No.: 09/669,969

(22) Filed: Sep. 26, 2000

(51) Int. Cl.
*H01M 8/04* (2006.01)
*H01M 4/86* (2006.01)
*H01M 2/00* (2006.01)

(52) U.S. Cl. .................... 429/26; 429/40; 429/20; 429/30; 429/34; 429/32; 429/17; 429/19

(58) Field of Classification Search ................ 429/26, 429/40, 20, 30, 34, 32, 17, 19
See application file for complete search history.

(56) References Cited

U.S. PATENT DOCUMENTS

| | | | |
|---|---|---|---|
| 4,650,727 A | 3/1987 | Vanderborgh et al. | 429/19 |
| 4,781,241 A | 11/1988 | Misage et al. | 165/1 |
| 5,043,232 A | 8/1991 | Landau et al. | 429/13 |
| 5,175,062 A | 12/1992 | Farooque et al. | 429/20 |
| 5,272,017 A | 12/1993 | Swathirajan et al. | 429/33 |
| 5,316,871 A | 5/1994 | Swathirajan et al. | 429/33 |
| 5,470,670 A | 11/1995 | Yasumoto et al. | 429/20 |
| 5,670,269 A | 9/1997 | Hamada et al. | 429/20 |
| 5,763,114 A * | 6/1998 | Khandkar et al. | 429/20 |
| 5,780,179 A | 7/1998 | Okamoto | 429/20 |
| 5,851,689 A | 12/1998 | Chen | 429/13 |
| 5,997,594 A * | 12/1999 | Edlund et al. | 48/76 |
| 6,183,703 B1 * | 2/2001 | Hsu et al. | 422/211 |
| 6,472,092 B1 * | 10/2002 | Matsuda et al. | 429/17 |
| 6,797,244 B1 * | 9/2004 | Lesieur | 422/222 |
| 2002/0071797 A1 * | 6/2002 | Loffler et al. | 422/190 |

OTHER PUBLICATIONS

Fuel Cell Information, "Fuel Cells—a long primer", www.slip.net/~h2man/fuelcell.htm.

* cited by examiner

*Primary Examiner*—Patrick Joseph Ryan
*Assistant Examiner*—Angela J. Martin
(74) *Attorney, Agent, or Firm*—Cary W. Brooks

(57) ABSTRACT

A reaction vessel that integrates and balances an endothermic process with at least one exothermic process of the fuel cell system. Preferably the exothermic process is conducted in stages to provide more uniform and/or controllable heat generation and exchange, and to produce a uniform and/or controllable temperature profile in the endothermic reaction process. The invention allows for the elimination of the working fluid loop of prior art systems that had unsatisfactory response times at startup, and during transient conditions, and also added to the overall mass and volume of the fuel cell system.

6 Claims, 4 Drawing Sheets

MULTIPLE STAGE COMBUSTION PROCESS TO MAINTAIN A CONTROLLABLE REFORMATION TEMPERATURE PROFILE

TECHNICAL FIELD

This invention relates to fuel cell systems and components, and more particularly to a fuel cell system that combines exothermic and endothermic processes in one reaction vessel.

BACKGROUND OF THE INVENTION

Alexander Grove invented the first fuel cell in 1839. Since then most of the fuel cell development has been primarily limited to applications supported by the government, such as the United States National Aeronautics and Space Administration (NASA), or to utility plants applications. However, recent developments in materials of construction and processing techniques have brought fuel cell development closer to significant commercial applications. A primary advantage of fuel cells is that fuel cells can convert stored energy to electricity with about 60–70 percent efficiency, with higher efficiencies theoretically possible. Further, fuel cells produce virtually no pollution. These advantages make fuel cells particularly suitable for vehicle propulsion applications and to replace the internal combustion engine which operates at less than 30 percent efficiency and can produce undesirable emissions.

Although fuel cells are desirable for vehicle propulsion applications, the fuel cell must be incorporated into a complicated on-board system that includes a fuel cell stack and auxiliary equipment. The following brief discussion of the operation and purpose of the fuel cell stack and its auxiliary equipment will be helpful in understanding the advantages and desirability of the present invention.

Fuel Cell Operation

A fuel cell principally operates by oxidizing an element, compound or molecule (that is, chemically combining with oxygen) to release electrical and thermal energy. Thus, fuel cells operate by the simple chemical reaction between two materials such as a fuel and an oxidant. Today, there are a variety of fuel cell operating designs that use many different fuel and oxidant combinations. However, the most common fuel/oxidant combination is hydrogen and oxygen.

In a typical fuel cell, hydrogen is consumed by reacting the hydrogen with oxygen from air to produce water, electrical energy and heat. This is accomplished by feeding the hydrogen over a first electrode (anode), and feeding the oxygen over a second electrode (cathode). The two electrodes are separated by an electrolyte which is a material that allows charged molecules or "ions" to move through the electrolyte. There are several different types of electrolytes that can be utilized including the acid-type, alkaline-type, molten-carbonate-type and solid-oxide-type. The so-called PEM (proton exchange membrane) electrolytes (also known as a solid polymer electrolyte) are of the acid-type, and potentially have high-power and low-voltage, and thus are desirable for vehicle applications.

FIG. 1 shows a fuel cell that has been simplified for purposes of illustrating the operation of a fuel cell. In the proton exchange membrane based fuel cell 10 shown, a hydrogen gas stream 12 is fed into a first sealed chamber or manifold (in the case of a fuel cell stack) 14 and over a first electrode (anode) 24 and on to a first face 16 (the anode side) of a proton exchange membrane assembly assembly 18. The proton exchange membrane assembly 18 typically includes the electrolyte membrane 19 having two faces, and on each face there is a catalyst, usually a noble metal such as platinum, and an electrically conductive diffusion media (such as a carbon fiber mat) overlying the catalyst. The catalyst and diffusion media are not shown in FIG. 1. The catalyst on the anode face of the assembly promotes the dissociation of hydrogen molecules and the catalyst on the cathode face of the assembly promotes the dissociation of oxygen molecules and a reaction of oxygen with hydrogen protons to produce water. The electrolyte membrane 19 allows the diffusion of hydrogen ions 26 from one electrode 24 to another electrode 34. FIG. 1 is a simple illustration attempting to depict the diffusion of these hydrogen ions 26 from the anode to the cathode side of the electrolyte membrane. However, the electrolyte membrane 19 does not include channels as shown in FIG. 1.

A compressed air stream 22 is supplied to a second chamber or manifold (for a fuel cell stack) 15 in a manner so that the compressed air flows over a second electrode (cathode) 34 and on to a second face 20 of the proton exchange membrane assembly 18. The proton exchange membrane assembly 18 is selective and allows only the hydrogen protons 26 to pass through the membrane assembly 18 rejecting larger diatomic hydrogen molecules 28. When a single hydrogen proton (or its equivalent) 26 passes through the membrane, it leaves behind an electron 30. The electrons 30 that are left behind can be collected in the electrode (conductor) 24. Typically fuel cell systems include a stack of single cells (fuel cell stack) with adjacent cells sharing a common electrode. In that case, the electrodes 24, 34 would be bipolar. Preferably each electrode 24, 34 includes channels 25 formed therein through which either hydrogen or oxygen flows.

The concentrated electrons in the electrode 24 causes a potential negative voltage on the electrode 24 due to the excess of electrons (because the electrons are negatively charged). When the oxygen molecules are directed to the second face 20 of the proton exchange membrane assembly 18, the oxygen meets the hydrogen proton 26 as the proton passes through the membrane. The chemical reaction of the hydrogen proton 26 and the oxygen on the cathode side of the cell requires electrons and therefore a shortage of electrons is created. The needed electrons can be supplied by a second electrode 34 (that is, the cathode electrode). The oxygen and the hydrogen proton 26, in the presence of the electrons 30 from the second electrode 34, easily combined to produce water 32. The reactions at the electrodes are as follows:

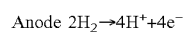

Anode $2H_2 \rightarrow 4H^+ + 4e^-$

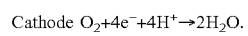

Cathode $O_2 + 4e^- + 4H^+ \rightarrow 2H_2O$.

With two electrodes 24, 34 in the fuel cell system (the anode and the cathode) an electrical potential exist between the two electrodes. That is, the hydrogen electrode 24 has an excess of electrons and the oxygen electrode 34 needs electrons. The electrical potential can be utilized by placing an electrical load, such as electrical motor 36 (to propel a vehicle) between the anode 24 and the cathode 34. Since electrical energy is used as it goes around the loop, the only by-products of this fuel system are water vapor and the heat loss through inefficiency of the cell itself (or about 30 percent of the power). With 70 percent efficiency, this process is significantly more attractive for extracting stored energy than an internal combustion engine that typically extracts only 20–30 percent of stored fuel energy.

Both hydrogen and oxygen are each supplied to the fuel cell in excess to provide the greatest rate of reaction possible. The hydrogen gas stream will be under pressure of about 3 bars if it is produced from a fuel reformation reaction and therefore the oxygen stream 22 must be pumped up to the same pressure to avoid damage to the proton exchange membrane and the catalyst of the assembly 18. Any water produced or remaining on either side of the fuel cell is removed and is discharged or may be sent through a water/vapor stream line 38 to a water reservoir (such as the holding tank 46 shown in FIG. 2) for use in other components or for use in the fuel cell at startup. The effluent or tail gas exhaust stream 40, 42 from both sides of the fuel cell are discharged to the atmosphere or preferably are supplied to a combustor for burning and producing heat needed for other operations such as the fuel reformation process described hereafter. Since the reactants are supplied to the fuel cell in excess, tail gas exhaust stream 40 from the anode side contains hydrogen and the tail gas exhaust stream 42 from the cathode side contains oxygen. Both of the fuel cell tail gas streams 40, 42 may be combusted in a catalytic combustor to provide heat for other components in the fuel cell system.

Preferably the fuel cell is maintained at a temperature of about 80 degrees Celsius or greater. Maintaining this temperature may require heat to be added or removed from the fuel cell stack. Often heat must be supplied to the fuel cell at startup. This heat can be supplied by a catalytic or flame combustor. However, during post startup or normal operation of the fuel cell, heat is generated by the fuel cell and the generated heat can be removed by any of a variety of heat exchange methods but preferably is removed using a liquid coolant.

Auxiliary Equipment

As will be appreciated from the forgoing, fuel cell systems require a variety of auxiliary equipment such as pumps, heat exchangers, fuel processors, combustors, water separation and collection equipment, hydrogen cleanup or purification systems and so on to support the operation of the fuel cell itself. Auxiliary equipment that is of interest with respect to this invention is discussed below.

Although compressed or liquefied hydrogen could be used to operate a fuel cell in a vehicle, to date this is not practical. The use of compressed or liquefied hydrogen ignores the extensive infrastructure currently being used to supplying gasoline for internal combustion engine automobiles and trucks. Consequently, it is more desirable to utilize a fuel such as methanol, gasoline, diesel, methane and the like to provide a hydrogen source for the fuel cell. However, the methanol, gasoline, diesel, methane and the like must be reformed to provide a hydrogen gas source. This is accomplished by using methanol or gasoline fuel processing or reforming equipment, and hydrogen cleanup or purification equipment.

Fuel cell systems often include a fuel processing section which reforms the fuel such as methanol, gasoline, diesel, methane and the like to produce hydrogen and a variety of other byproducts. However, these reforming (reformation) processes are endothermic and require energy input to drive the reformation reaction.

Typically, a catalytic or flame combustor is utilized to provide heat for the reforming process. Most often, this is accomplished by utilizing a working fluid (liquid or gas) loop that transfers heat from the combustion process to the reforming process. However, the response time for heat transfer needed during startup and transient conditions of the fuel cell are less than optimal when the system uses a fluid to transfer heat between the combustor and the reformer vessel. Further, the working fluid loop, associated heat exchangers and piping add to the overall mass and volume of the fuel cell system.

Thus it would be desirable to provide a low-cost, low-weight system for supplying heat to a fuel cell reforming process and wherein the system is responsive to the heat load fluctuations of the reforming process. The present invention overcomes some of the inefficiencies of the prior art

SUMMARY OF INVENTION

The invention includes a reaction vessel that integrates and balances an endothermic process with at least one exothermic process of a fuel cell system. Preferably the exothermic process is conducted in stages to provide more uniform and/or controllable heat generation and exchange, and to produce a uniform, and/or controllable temperature profile in the endothermic reaction process, if desired (depending on the fuel used). The invention eliminates the working fluid heat exchange loop of prior art fuel reforming sections that had unsatisfactory response times at startup, and during transient conditions, and also added to the overall mass and volume of the fuel cell system.

One embodiment of the invention includes a reaction vessel having an outer shell and catalyst carried in the shell for promoting an endothermic reaction. The reaction vessel is constructed and arranged to charge an endothermic reactant(s) into the shell. A plurality of heat exchanger devices are also provided having portions separately positioned and carried within the shell. Each heat exchanger device is independently controlled from the other heat exchanger devices so that heat transferred by the heat exchanger devices to the catalyst, and the temperature of the catalyst in the shell, may be varied at different locations within the reaction vessel. Preferably the reaction vessel is constructed and arranged so that exothermic reactants may be charged into each heat exchanger device and combusted to generate heat for driving the endothermic reaction occurring in another portion of the reaction vessel. The exothermic reactants may include anode and cathode exhaust streams from a fuel cell stack.

Another embodiment of the present invention includes a reaction vessel having a plurality of endothermic reaction sections and a plurality of heat transfer devices. Each heat transfer device is associated with an endothermic reaction section so that sufficient heat may be transferred to the endothermic reaction section and so as to control the temperature profile of the endothermic reaction section within a predetermined range. The endothermic reaction sections may be spaced apart from each other and so that a heat transfer device is positioned between adjacent spaced apart endothermic reaction sections.

Another embodiment of the present invention includes a combination reaction vessel having multiple staged catalytic combustion chambers and a plurality of endothermic reaction chambers. Each endothermic reaction chamber has a combustion chamber adjacent thereto so that heat generated in the combustion chamber is transferred to the adjacent endothermic reaction chamber. Each catalytic combustion chamber may have a plurality of reactant charge openings for supplying at least one reactant to the catalytic combustion chamber. The charge openings may be positioned within the catalytic combustion chamber to provide a substantially uniform temperature along the length of the catalytic combustion chamber.

Another embodiment of the invention includes a charge manifold having a plurality of charge pipes extending therefrom. Each charge pipe extends into an exothermic reaction chamber. The charge pipes have charge holes provided along the length of each charge pipe so the fuel or oxidant may be charged into the combustion reaction chamber through the charge holes. Preferably valves are associated with each charge pipe and a controller is provided for selectively controlling the amount of fuel or oxidant charged to each exothermic reaction chamber. Each charge pipe may separate adjacent side-by-side exothermic reaction chambers. A directional flow header may be provided at the end of each exothermic reaction chamber for directing gases exiting one exothermic reaction chamber to the entrance of an adjacent side-by-side exothermic reaction chamber.

Another embodiment of present invention includes the incorporation of a fuel/water vaporizer into the combination reaction vessel. A fuel/water mixture is injected into a plurality of vaporization chambers and is vaporized by heat generated by the catalytic combustion of a fuel mixture charged into a plurality of exothermic reaction chambers. No catalyst is provided in the vaporization chambers. An oxidant and fuel are charged into the exothermic reaction chambers and catalytically combusted to produce heat to vaporize the fuel/water mixture.

Another embodiment of present invention includes a combination reaction vessel that incorporates an exothermic and endothermic reaction. The reaction vessel includes a plurality of endothermic reaction chamber sections that are spaced apart vertically and horizontally. A plurality of exothermic reaction chamber sections are also provided in a spaced apart fashion so that a partition section is provided between laterally spaced apart exothermic reaction chamber sections. The partition sections provide for staged adiabatic reforming of the fuel/water mixture. The catalyst loading in different portions of the endothermic reaction chamber sections may be varied as desired.

These and other objects, features and advantages of present invention will become apparent from the following brief description of drawings, detailed description of preferred embodiments, and appended claims and drawings.

DESCRIPTION OF THE PREFERRED EMBODIMENT

Figure 1:
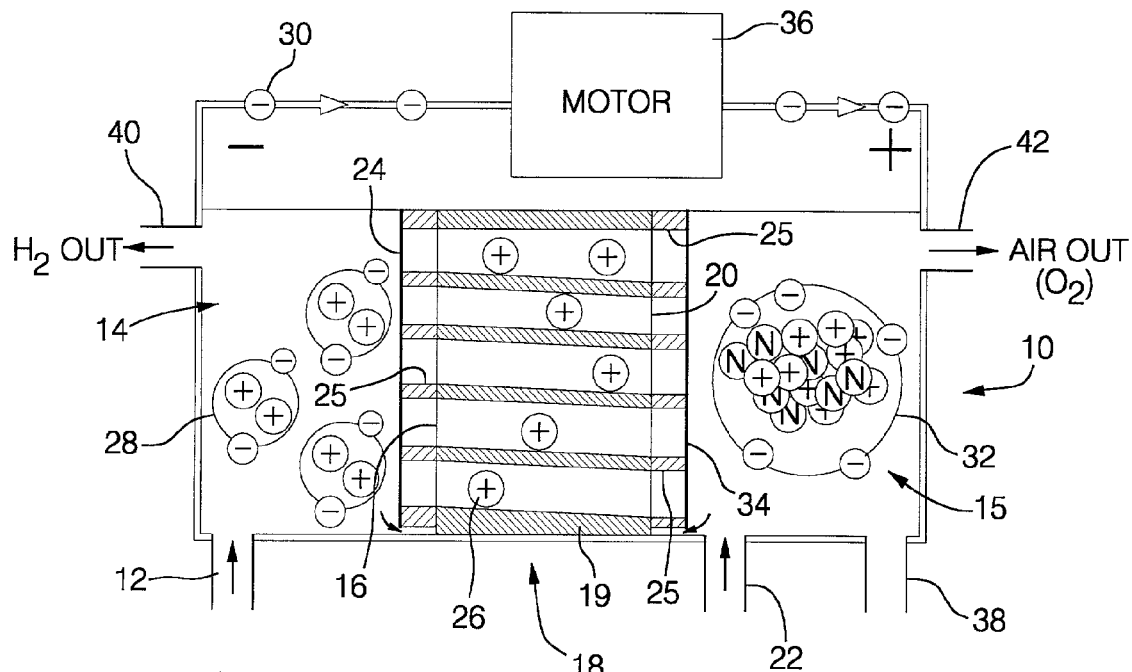
FIG. 1 illustrates a fuel cell useful in the present invention.
Figure 2:
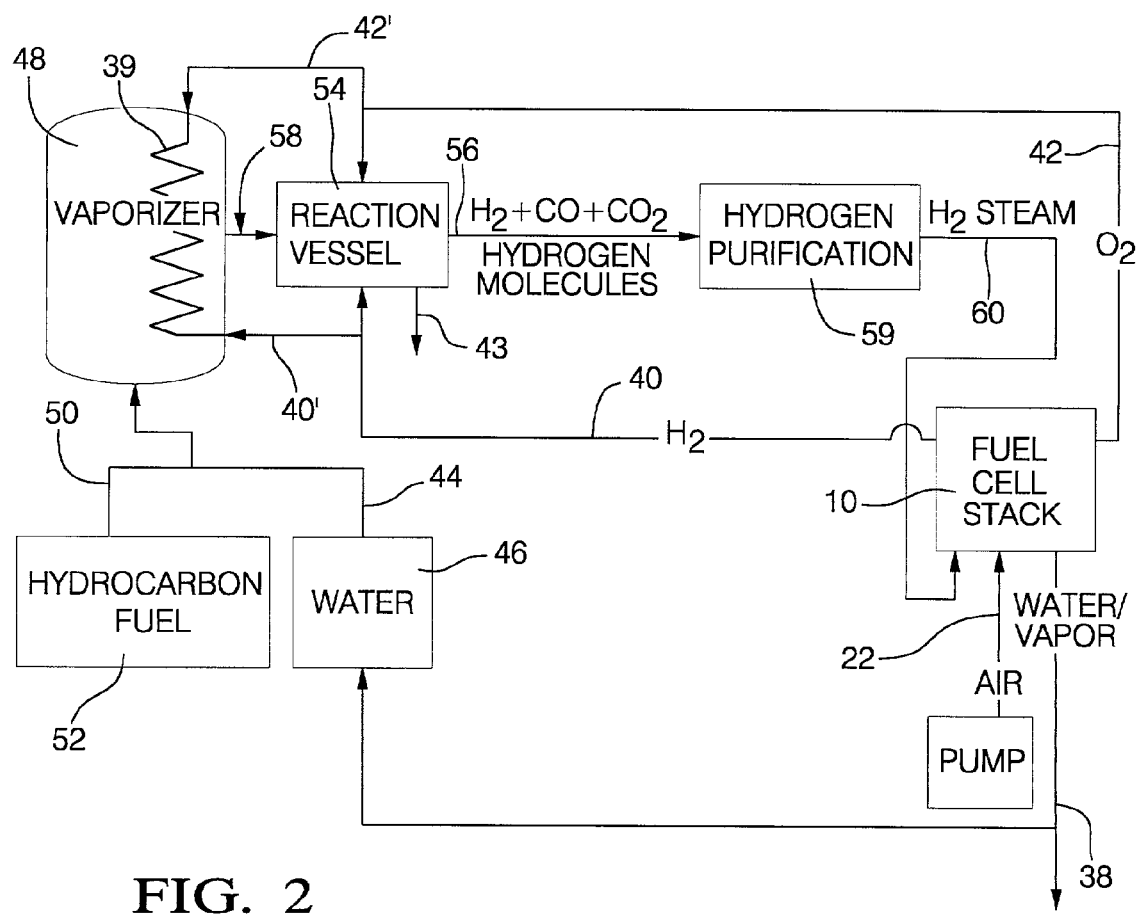
FIG. 2 is a schematic illustration of a fuel cell system useful in a present invention.

Referring now to FIG. 2, the fuel cell system according to the present invention includes a fuel cell (or fuel cell stack) 10. The system may also include the following auxiliary equipment to support the fuel cell stack 10. Water is provided and held in a water reservoir or holding tank 46 which is connected to a vaporizer 48 by water line 44. A fuel source is provided and held in a tank 52 that is also connected to the vaporizer 48 by line 50. Preferably the fuel used is methanol, gasoline, diesel, methane and the like. The fuel and water may be vaporized by any method known to those skilled in the art, but preferably the heat for the vaporization step is supplied by a heat exchanger 39 in the vaporizer that catalytically combusts hydrogen 40' and oxygen 42' from the fuel cell stack 10 exhaust. Alternatively, the vaporizer may be included as an integral part of the reaction vessel 54 as will be described hereafter. The fuel and water are vaporized together (or may be vaporized separately) and a resultant vaporized fuel/water stream is delivered via line 58 to an endothermic reaction section of a combination reaction vessel 54. Preferably a fuel reformation process is conducted in the endothermic reaction section.

The combination reaction vessel 54 also houses an exothermic reaction section. The exothermic reaction may be, for example, catalytic combustion of a fuel or preferential oxidation of the exhaust stream from the fuel reforming section. If the exothermic reaction process is catalytic combustion, preferably the anode exhaust stream 40 and cathode exhaust stream 42 from the fuel cell 10 are used as the catalytic combustion reactants. The exhaust from the exothermic reaction may be discharged to the atmosphere via line 43.

The reformation process effluent stream 56 may include hydrogen molecules ($H_2$), CO, $CO_2$, $N_2$, $CH_4$. The reformation process effluent stream 56 may be delivered to a hydrogen purification section 59 to reduce the concentration of CO and hydrocarbons (or carbon based molecules). The hydrogen purification section 59 may include any of a variety of components for purifying the reformation process effluent stream 56 and may include high and low temperature reactors to shift the equilibrium of the stream 56 constituents (thus reducing the concentration of CO), preferential oxidation reactor(s), additional hydrocarbon reforming components, separators, adsorbers and similar equipment. Eventually a hydrogen rich stream 60 is delivered to the anode side of the fuel cell 10.

As indicated earlier, air 22 is pumped to the cathode side of the fuel cell 10. The anode and cathode exhaust streams from the fuel cell stack carry water that can be condensed out using a separator/condenser as the stream exits fuel cell stack and the liquid water may be sent to reservoir 46. Alternatively, the water may be condensed out after the stack effluent passes through exhaust tail gas combustors.

Figure 3:
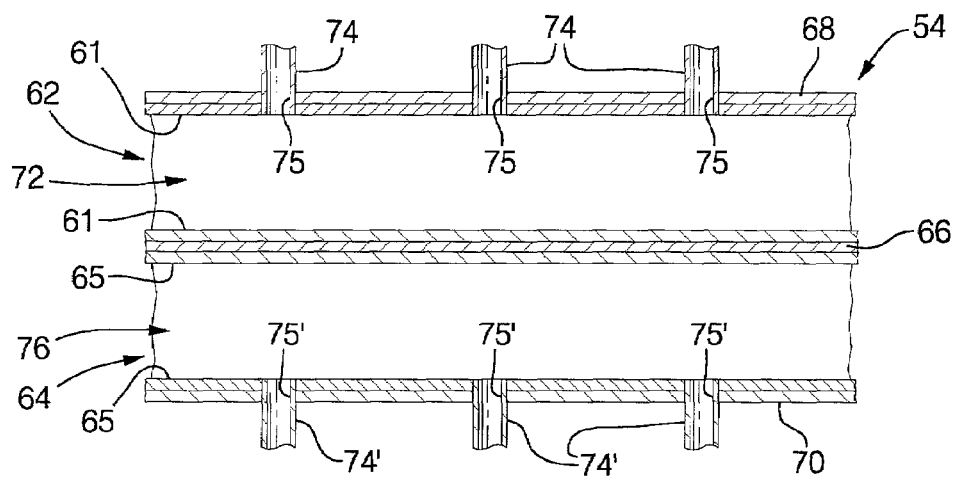
FIG. 3 is a sectional view of a combination reaction vessel for housing an endothermic and an exothermic reaction according to the present invention.

FIG. 3 illustrates a combination reaction vessel 54 for housing an endothermic and an exothermic reaction. The combination reaction vessel 54 includes an endothermic reaction chamber section 62 and an exothermic reaction chamber section 64 that share a common wall or substrate 66. Each endothermic reaction chamber section 62 and exothermic reaction chamber section 64 includes an associated outside wall 68, 70 respectively. A catalyst 61 for promoting the reformation reaction of the fuel and water, is provided in the endothermic reaction chamber section 62. As illustrated in FIG. 3 the catalyst 61 may overlie at least one of the outside wall 68 and/or the substrate 66. The catalyst 61 may be provided directly on the outside wall 68 or the substrate 66, or intermediate layers (not shown) may be provided therebetween. The vaporized fuel and water mixture may enter the endothermic reaction chamber section 62 from one end 72 or may be selectively charged to the endothermic reaction chamber through charge lines 74 or openings 75 selectively positioned along the length of the endothermic reaction chamber section 62. The term "endothermic reactants" as used herein means reactants of an endothermic reaction. In this case, for example, the endothermic reactants are the organic fuel and water.

The exothermic reaction chamber section 64 may be similarly constructed. As illustrated in FIG. 3, an exothermic catalyst 65 may overlie at least one of the outside wall 70 or substrate 66. Similarly, the catalyst 65 may be provided directly on the outside wall 70 or the substrate 66, or intermediate layers (not shown) may be provided therebetween. In one embodiment of the invention, a fuel combustion process may be conducted in the exothermic reaction chamber 64. An oxidant such as oxygen (from air) may be charged into the chamber section 64 through one end 76 of the chamber and a fuel such as hydrogen or a hydrocarbon may be supplied to the chamber through one or more charge lines 74' or through a charge openings 75' that may be positioned along the length of the exothermic reaction chamber section 64. Alternatively, the fuel may be charged through the open end 76 and the oxidant supplied through the charge lines 74' or charge openings 75'. In another embodiment, an exothermic reaction such as a preferential oxidation reaction to reduce CO or hydrocarbons may be conducted in the exothermic reaction chamber section 64. In any event, the heat generated by the exothermic reaction in the exothermic reaction chamber section 64 is transferred through the substrate 66 to warm the endothermic reaction chamber section 62, catalyst 61 and reactants, and to drive (that is, to provide the heat necessary to complete the reaction) the endothermic reaction process. The term "exothermic reactants" as used herein means the reactants of an exothermic reaction. The exothermic reactants may include a fuel such as an organic fuel including, for example, hydrogen, methanol, gasoline, diesel, methane and the like; and an oxidant, such as oxygen in the form of air.

Figure 4:
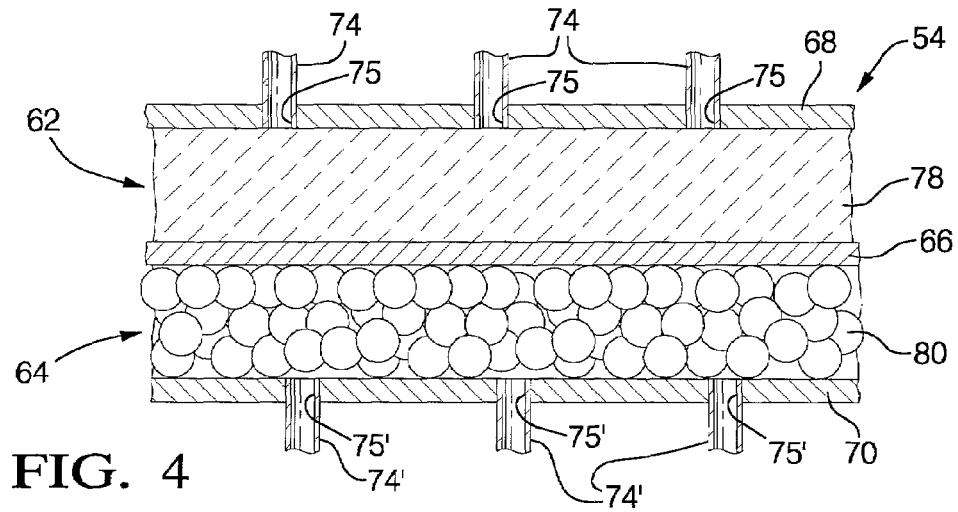
FIG. 4 is a sectional view of an alternative embodiment of a combination reaction vessel for housing an endothermic and an exothermic reaction according to the present invention.

FIG. 4 illustrates an alternative embodiment of the present invention wherein either the endothermic or the exothermic catalyst may be provided on a solid porous substrate 78 or porous pellets 80 or any of a variety materials that would provide increased surface area for either of the catalysts. When the catalyst is on a high surface area material such as a porous block or porous pellets that are carried in the chamber, the catalyst is also considered to be overlying the substrate for purposes of this invention.

Figure 5:
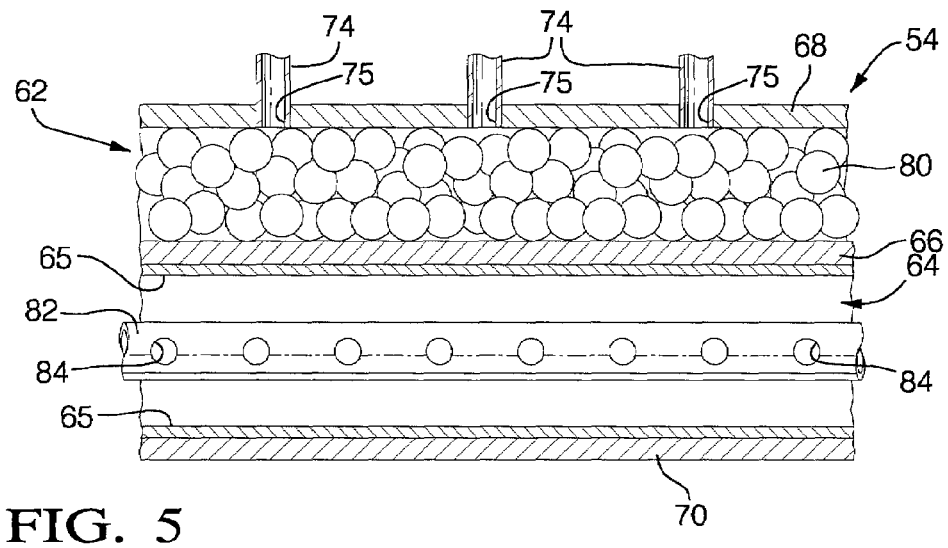
FIG. 5 is a sectional view of an alternative embodiment of a combination reaction vessel for housing an endothermic and an exothermic reaction according to the present invention.

FIG. 5 illustrates an alternative embodiment of the present invention wherein a reactant charge pipe 82 extends into one of the reaction chambers 62, 64 and has a plurality of discharge holes 84 formed therein along the length of the reaction chamber to selectively discharge a reactant into the chamber at predetermined locations. Preferably, the charge pipe 82 delivers a fuel such as hydrogen to the combustion reaction chamber 64 which has an oxidant such as oxygen or air flowing therein. Alternatively, the charge pipe 82 may be used to introduce oxygen to allow for staged preferential oxidation. The use of the reactant charge pipe 82 with discharge holes 84 allows the fuel or oxidant to be supplied in relatively low concentrations so as to reduce the risk of autoignition and also to provide a more uniform heat generation profile along the length of the exothermic reaction chamber 64. Of course, porous catalyst pellets or another suitable supported catalyst may be provided in the exothermic reaction chamber 64.

The substrate 66 (shown in FIGS. 3–5) may be made from a variety of materials having suitable heat transfer characteristics and may include any of several metals such as stainless-steel, copper, aluminum, or any of a variety of composites, ceramics, compounds or polymer base materials.

As described earlier, when the exothermic reaction produces heat, the heat is transferred through the substrate wall 66 separating an adjacent set of chambers 62, 64. As such, the combination reaction vessel provides a staged exothermic reaction process (preferably combustion of a fuel) to provide a uniform temperature profile and heat transfer to drive an endothermic reaction (preferably a fuel reforming process) occurring in an adjacent chamber.

Figure 6:
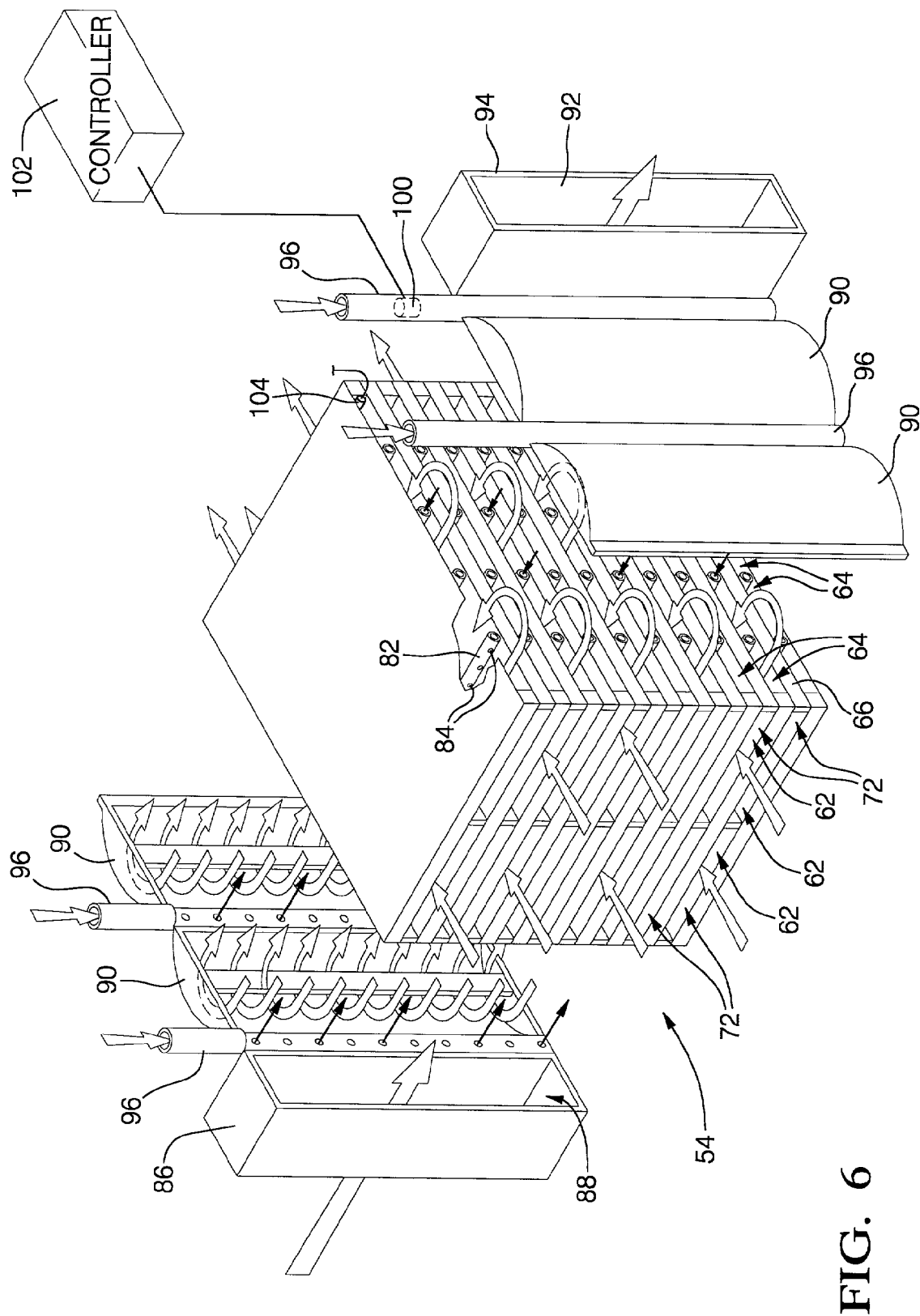
FIG. 6 is an exploded, prospective view, with portions broken away, of an alternative embodiment of a combination reaction vessel for housing an endothermic and an exothermic reaction according to the present invention.

Referring now to FIG. 6, another embodiment of the present invention includes a combination reaction vessel 54 having a plurality of spaced apart, parallel endothermic reaction chambers 62. In this case the endothermic reaction chambers 62 are vertically spaced apart and separated by an exothermic reaction chamber 64 that has a longitudinal axis and flow path running in a perpendicular direction to the longitudinal axis and flow path of the endothermic reaction chamber 62. However, parallel co-flowing and counter flow configurations are contemplated as a part of the present invention. As described earlier, an endothermic reaction catalyst is provided in each of the endothermic reaction chambers 62 and the endothermic reactants, such as a methanol/water, gasoline/water vapor mixture, or other fuel/water mixture are supplied through one end 72 (see also FIG. 3) of the endothermic reaction chamber and flow in the direction indicated by arrow shown entering the reaction chamber 62 in FIG. 6.

A plurality of spaced apart parallel exothermic reaction chambers 64 are provided so that each exothermic chamber 64 separates two endothermic reaction chambers 62 so as to provide a staged exothermic reaction process. The exothermic chambers 64 may also be arranged in a laterally adjacent side-by-side configuration. An inlet header 86 is provided having an inlet opening 88 formed therein through which at least one of the exothermic reactants is charged to the exothermic reaction chambers 64. Preferably, exhaust gas (which contains oxygen) from the cathode side of the fuel cell is feed through the inlet opening 88. The cathode exhaust gas flows down a first set of exothermic reaction chambers and is directed by a flow directing header 90 down a second set of exothermic reaction chambers, and so on in a serpentine fashion throughout the combination reaction vessel 54 and finally exits through an exhaust opening 92 formed in an outlet header 94.

A second exothermic reaction reactant may be charged into the exothermic reaction chambers 64 utilizing a charge manifold 96. In a preferred embodiment, the charge manifold 96 includes a plurality of charge pipes or lines 82. A charge pipe 82 is received in one of each of the exothermic reaction chambers 64. Preferably, the charge pipe 82 has a plurality of discharge holes 84 which are spaced apart along the length of the exothermic reaction chamber (as also shown in FIG. 5). The combination reaction vessel 54 may be constructed and arranged so that the charge pipes 82 also function to separate laterally adjacent side-by-side exothermic reaction chambers. That is, the charge crepe 82 acts as a wall separating laterally adjacent exothermic reaction chambers. Because the exothermic reaction chambers 64 are staged in sections and at least one reactant is selectively and/or uniformly charged to each chamber along the length of the exothermic chamber, the heat generated throughout the exothermic reaction chamber may be controlled so that it is substantially uniform, or graduated is so desired. Consequently, the heat transferred to the endothermic reaction chamber, catalyst and reactants is such that the temperature profile in the endothermic reaction chamber is controlled to be substantially uniform, or graduated if so desired. Maintaining a controllable temperature profile in a fuel reforming process is important to avoid undesirable side effects such as catalyst degradation, or methane slip. At low power, the temperature profile may be such as to promote a high temperature reformation with a high temperature shift reaction at the exit of the reaction chamber. The temperature at the exit end of the reaction chamber should be high enough to suppress methane formation for a given catalyst.

A plurality of temperature or concentrations sensors 104 may be selectively placed in the combination reaction vessel, and valves 100 may be included in the charge manifold 96 to selectively control the amount of reactant being charged to the chamber and thus control the reaction as desired. Associated on-board computer controllers 102, drivers and associated electrical equipment can be provided to control the above described components and processes in a manner known to those skilled in the art.

For example, in a methanol reformer, the charge manifold 96 may be constructed and arranged to controllably charge reactants so that a uniform temperature profile at full power is provided which would utilize the entire reactor volume. However, under turndown situations (for example, when the vehicle is stopped), less power is require, and thus only a portion of the reactor is required to reform fuel because of the lower power demand. In these turndown situations it may be desirable to control the exothermic reaction adjacent to each endothermic reaction chamber section so that only selected endothermic reaction chamber sections or portions of selected endothermic reaction chambers sections are provided with enough heat to reform fuel. The remaining endothermic reaction sections or portions thereof could be utilized to perform a water gas shift reaction to reduce the concentration of CO in the fuel reforming stream. For example, the temperature in the first two endothermic reaction sections could be controlled to provide relatively high temperature fuel reforming and the temperature in the remaining endothermic reaction sections (that is, in the rearward portion of the reaction vessel) could be controlled to be relatively low thereby reducing unwanted reformation byproducts and so that a maximum conversion is accomplished during the fuel reforming while minimizing methane slip.

Figure 7:
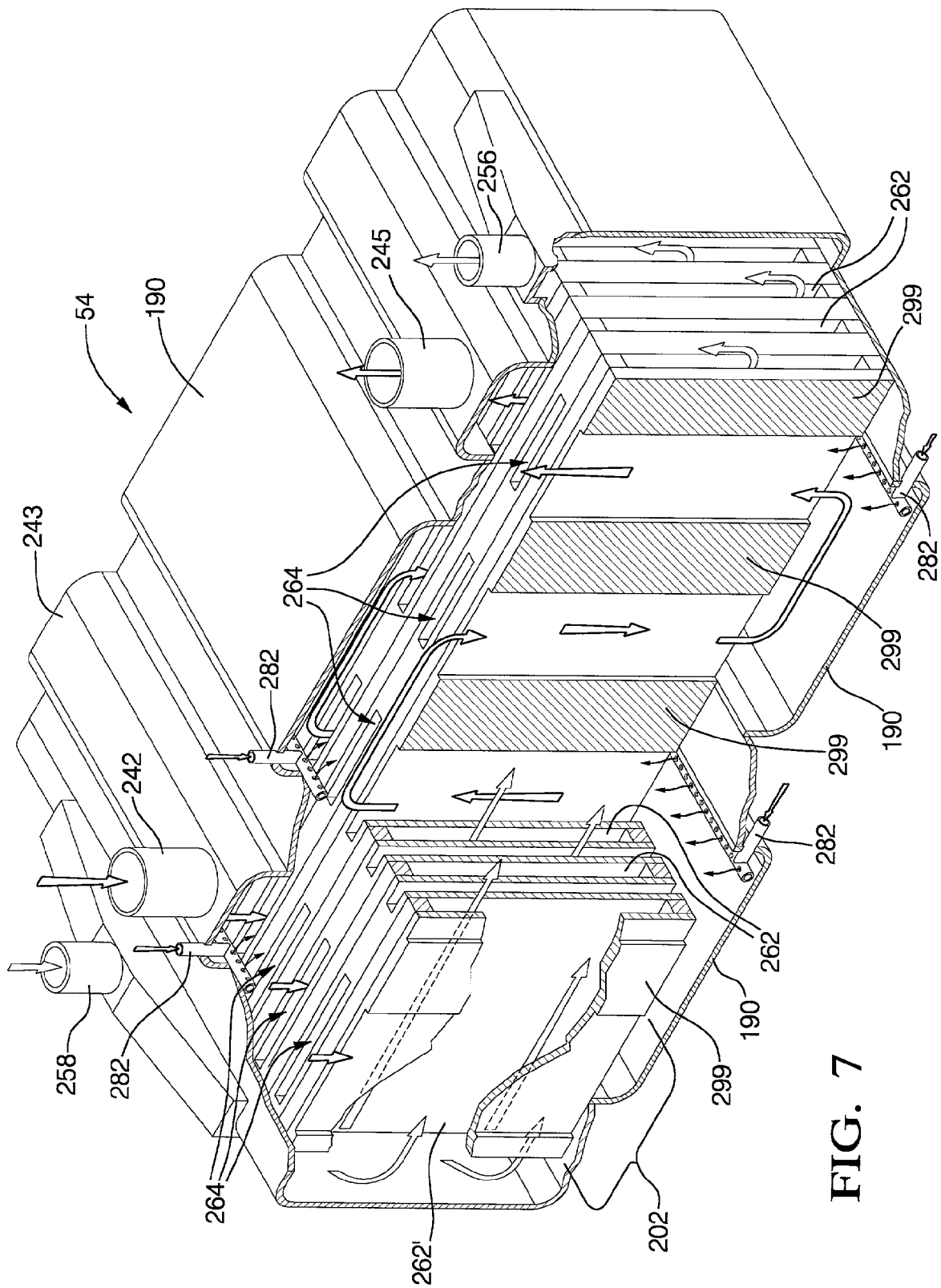
FIG. 7 is a sectional view of an alternative embodiment of a reaction vessel for housing a staged endothermic reaction according to the present invention.

An another embodiment, illustrated in FIG. 7, the vaporizer may be included in the front portion of the combination reaction vessel 54. The combination reaction vessel shown in FIG. 7 operates similarly to the vessel shown in FIG. 2, but with a few exceptions. In this embodiment, a fuel/water mixture may be charge through line 258 into a first section of the combination reaction vessel 54 to be vaporized in a first heat exchanger section 202. The fuel/water mixture flows through a plurality of spaced apart chamber 262' that do not include a fuel reforming catalyst. Thereafter, the endothermic reaction chambers 262 include a fuel reforming catalyst as previously discussed.

The fuel/water mixture entering the chambers 262' is vaporized by heat generated by the catalytic combustion of a combustion fuel mixture charged into a plurality of exothermic reaction chambers 264. An oxidant or fuel, preferably an oxidant such as oxygen from the fuel cell stack effluent, may be charged to the exothermic reaction chambers 264 through a charge line 242 and header 243. An oxidant or fuel, preferably a fuel such as hydrogen from the fuel cell stack effluent, is charged to the exothermic reaction chambers 264 through charge line 282. A combustion fuel mixture travels through the plurality of spaced apart exothermic reaction chambers 264 generating heat to vaporize the fuel/water mixture or reform the fuel/water mixture. Preferably one of the oxidant or fuel is charged to the exothermic reaction chambers 264 through charge lines 282 in a staged fashion as previously discussed. However, in this embodiment, the exothermic reaction chambers 264 to are spaced apart vertically and horizontally so that a partition section 299 is provided between laterally spaced apart exothermic reaction chambers 264. The partition sections 299 provide for staged adiabatic reformation of the fuel/water mixture. If desired, the catalyst loading in different portions of the endothermic reaction chambers 262 may be varied as desired. That is, the catalyst loading may be graded throughout the reforming sections. The combination reaction vessel 54 may include flow directing headers 190 to directing the flow of exhaust exiting the first set of exothermic reaction chambers 264 so that it enters a second set of exothermic reaction chambers that are spaced a distance from the first set. The combustion reaction exhaust exits the vessel through line 245 in the reformation reaction exhaust exits the vessel through line 256.

The invention claimed is:

1. A fuel cell system comprising:

a reaction vessel having a catalyst carried in the vessel for promoting an endothermic reaction, the reaction vessel being constructed and arranged to allow endothermic reactants to be charged into the vessel, and further comprising at least a first and a second heat exchanger device spaced apart from each other and carried within the vessel, and wherein the first and second heat exchanger devices are constructed and arranged to be independently controlled from each so that heat transferred by the heat exchanger devices to the catalyst, and the temperature of the catalyst, may be varied at different locations within the reaction vessel corresponding to the location of the first and second heat exchanger devices, and wherein the reaction vessel comprises a plurality of parallel substrates, each of the substrates having a first and a second surface, and wherein the first and second surfaces are located on opposite sides of the substrate, and an endothermic reaction catalyst overlying the first surface, and an exothermic reaction catalyst overlying the second surface, and wherein each of the substrates is constructed and arranged to transfer heat from the second surface to the first surface.

2. A fuel cell system as set forth in claim 1 wherein the reaction vessel is constructed and arranged so that exothermic reactants may be charged into each heat exchanger device and wherein the exothermic reactants comprising a fuel and an oxidant, and wherein each of the heat exchanger devices includes at least one combustion chamber, and wherein at least one of the fuel and the oxidant are selectively charged to each combustion chamber in a controlled amount so that the heat generated by each of the heat exchanger devices may be varied as desired.

3. A fuel cell system comprising:
a reaction vessel integrating an exothermic reaction and an endothermic reaction, the reaction vessel including a plurality of substrates, each of the substrates having a first and a second surface, and wherein the first and second surfaces are located on opposite sides of the substrate, and an endothermic reaction catalyst overlying the first surface, and an exothermic reaction catalyst overlying the second surface, and wherein each of the substrates is constructed and arranged to transfer heat from the second surface to the first surface.

4. A fuel cell system as set forth in claim 3 wherein the substrate comprises at least one of stainless steel, copper, aluminum, a composite or polymer based materials.

5. A fuel cell system as set forth in claim 3 wherein the substrate has a substantially flat planar configuration.

6. A fuel cell system as set forth in claim 1 wherein the substrate comprises a metal comprises comprising at least one of stainless steel, copper or aluminum.

* * * * *